Patented Apr. 28, 1925.

1,535,365

UNITED STATES PATENT OFFICE.

GILBERT E. DOAN, OF CLEVELAND, OHIO, ASSIGNOR TO RAIL WELDING AND BONDING COMPANY, OF CLEVELAND, OHIO, A CORPORATION OF DELAWARE.

WELDING ELECTRODE.

No Drawing.   Application filed November 12, 1921.   Serial No. 514,693.

*To all whom it may concern:*

Be it known that I, GILBERT E. DOAN, a citizen of the United States, and a resident of Cleveland, county of Cuyahoga, State of Ohio, have invented certain new and useful Improvements in Welding Electrodes, of which the following is a specification.

This invention relates to electric welding and in particular is concerned with electrodes of novel composition and properties.

One object of my invention is to provide an electrode for electric welding which will be a good conductor of heat and electricity and not subject to rapid oxidation due to the passage therethrough of an electric current.

Another object is to provide an electrode for arc welding capable of producing an arc having a lower temperature than the arc produced by the ordinary carbon electrode.

Another object is to provide an electrode for arc welding which will be durable and highly resistant to the action of the arc.

Another object is to provide an electrode, for an arc welding process wherein the electrode does not enter the weld metal in any substantial amount, which is characterized by being composed of material which is a good conductor of electricity and heat both as compared with carbon.

Among the various methods of welding metals in practise at the present time is the process of carbon arc welding in which an arc is drawn from the article to be welded to an electrode composed of or containing carbon, the carbon electrode forming the negative terminal in the arc circuit. Such electrodes are subject to breakage in handling with consequent wastage and are also burned up by the high temperature of the arc and the heat generated in the electrode by passage of current therethrough. Furthermore due probably to the high boiling point or volatilizing point of carbon, the temperature of the arc is considerably higher when such electrodes are employed than is required, desirable or would exist if electrode materials having a lower boiling point were used.

By my invention, however, I have been able to overcome these and other disadvantages of the present electrodes by providing an electrode of a composition which, so far as I am aware, has never been proposed heretofore for such purposes and which is characterized as being sufficiently ductile and strong to prevent easy breakage in handling, substantially unaffected and unoxidized by the arc and having a boiling point considerably lower than that of carbon.

An important advantage incident to the use of electrodes having such properties is that the weld or seam metal is formed by a relatively cool arc and is thus less liable to be overheated or otherwise injured. Electrode materials embodying my invention tend to give better control of the arc and to prevent what is commonly known as arc blowing. The exact theory which would explain this action of the electrode materials is not thoroughly understood but I believe that the equilibrium of the arc is not disturbed as much where the rate of oxidation of the electrode material is slow as where this rate is relatively high. The comparatively low arc temperature also tends to prevent arc blowing and in this way to give better control of the arc.

These various advantages I obtain by the use of certain substances characterized by having the various properties enumerated above and exemplified by titanium, platinum, iridium, osmium, and suitable alloys of the same, as well as refractory oxides and alkaline earths, exemplified respectively by zirconium oxide and calcium oxide. However, I do not wish to be understood as including in the above examples all substances which would be suitable for my purpose since a broad definition of suitable substances has been made hereinabove.

Electrodes embodying my invention are especially suitable for use in arc welding processes wherein the electrode does not enter the weld or seam metal in substantial amounts for forming a material part of such metal, as exemplified in the present carbon arc welding process and in contrast with the well known metal electrode process in which the electrode is melted and forms a part or substantially all of the weld metal.

In practising my invention as applied to an arc welding process wherein the material of the electrode does not enter the weld metal in substantial amounts, I provide as one terminal of an arc circuit an electrode consisting of one or more of these elements alone or combined with each other or with other substances in any suitable proportion, the work pieces to be welded forming the other terminal or pole and thus being of the same polarity. After the necessary connections have been made an arc is drawn between the work pieces and the electrode, the arc thus established serving to melt the metal of the articles to be welded which molten metal upon cooling forms a weld or seam in the manner familiar to those skilled in the art, the electrode embodying my invention remaining substantially unaffected throughout the operation.

It is obvious that electrodes embodying my invention are equally applicable to resistance welding processes especially spot welding, due primarily to the characteristics of the material constituting the electrodes. Accordingly, while I have described in some detail hereinabove the application of my invention to electric arc welding processes, I do not desire to be understood as limiting myself thereto since that is but one of various applications of my invention, the scope of which is defined by the appended claims.

What I claim is:

1. An electrode for electric arc welding comprising a substance incapable of being substantially effected by the temperature of an electric arc and characterized by having a boiling point relatively low as compared with the boiling or volatilizing points of carbon.

2. An electrode for electric arc welding comprising a substance substantially incapable of being effected by the temperature of the arc and characterized by having a relatively high heat conductivity and low boiling point, both as compared with the conductivity and with the melting or volatilizing points of carbon.

3. An electrode for electric arc welding comprising a substance substantially incapable of being effected in the electric arc and characterized by offering substantially the same resistance to the passage therethrough of an electric current as the metal parts being joined by the arc, whereby the temperature of the electrode is substantially the same as that of the parts to be joined.

4. An electrode for electric welding composed chiefly of one or more of the metals titanium, platinum, and osmium.

In testimony whereof I hereunto affix my signature.

GILBERT E. DOAN.